United States Patent [19]
Lefever

[11] 3,730,201
[45] May 1, 1973

[54] TRANSMISSION OF MIXED PETROLEUM PRODUCTS THROUGH A FROZEN MEDIUM

[76] Inventor: Kenneth W. Lefever, Waterford, Va. 22901

[22] Filed: Mar. 16, 1971

[21] Appl. No.: 124,987

[52] U.S. Cl. ..................137/13, 62/55, 62/260, 165/45, 252/8.3
[51] Int. Cl. ............................................F17d 1/16
[58] Field of Search ..................48/190; 62/45, 55; 137/13; 166/DIG. 1; 252/8.3; 208/370; 165/45

[56] References Cited

UNITED STATES PATENTS

| | | | |
|---|---|---|---|
| 3,650,119 | 3/1972 | Sparling | 62/55 |
| 3,674,086 | 7/1972 | Foster | 165/45 |
| 1,762,423 | 6/1930 | Sharpenberg | 48/190 |
| 2,231,500 | 2/1941 | Harlow | 48/190 X |
| 3,389,714 | 6/1968 | Hughes et al. | 137/13 |
| 3,564,862 | 2/1971 | Hashemi et al. | 62/56 |

OTHER PUBLICATIONS

World Oil: Page 85, Alaskan Completions Will Be Complicated January, 1970.

Primary Examiner—Meyer Perlin
Assistant Examiner—Ronald C. Capossela
Attorney—John J. Gallagher

[57] ABSTRACT

A method of transmitting a petroleum product through a frozen medium which is structurally unstable at temperatures at or above freezing. A fluid which is normally gaseous at ambient temperatures is liquified and mixed with the petroleum product to be transmitted. The mixture is then transmitted through a pipeline supported by the frozen medium and the fluid is maintained in a liquid state throughout the length of the pipeline.

4 Claims, 1 Drawing Figure

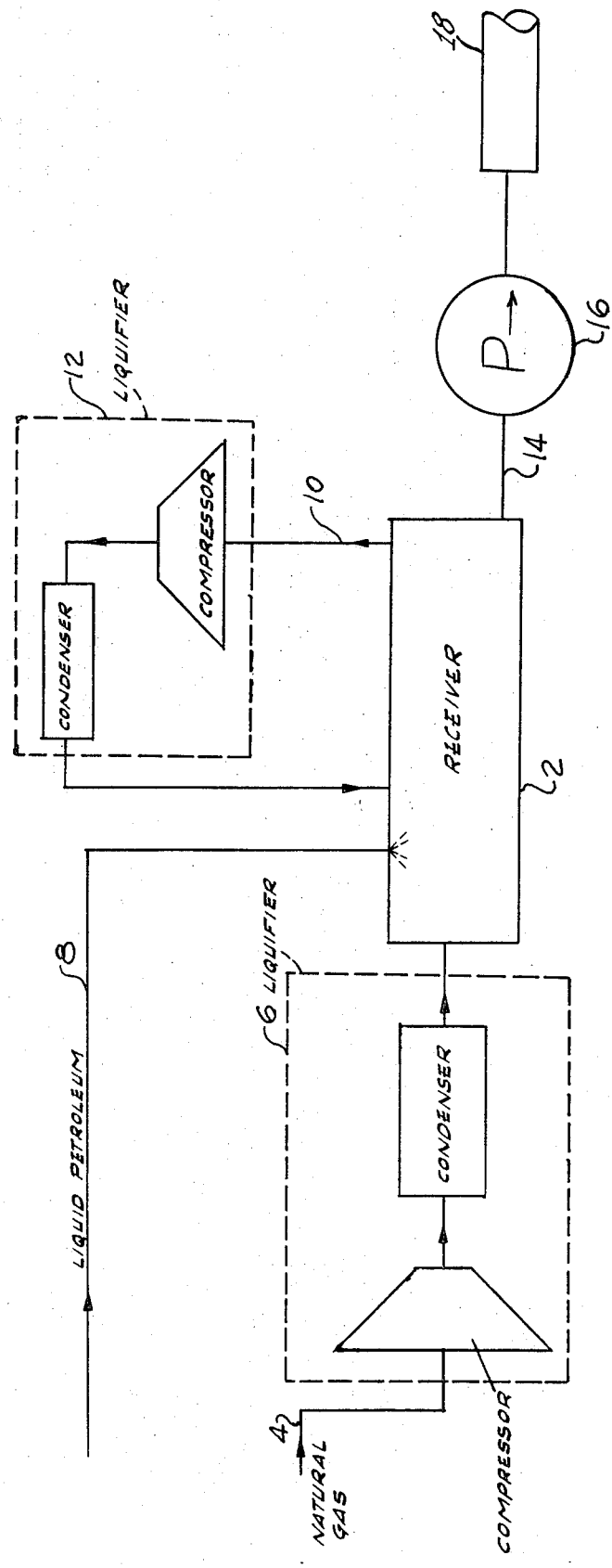

3,730,201

TRANSMISSION OF MIXED PETROLEUM PRODUCTS THROUGH A FROZEN MEDIUM

BACKGROUND OF THE INVENTION

This invention relates generally to transportation of materials by pipeline and more particularly to the transportation of petroleum products by pipeline through frozen media such as ice or permafrost.

A principal problem encountered in any construction in or through frozen media such as ice or permafrost is the instability of the media at or above freezing temperatures therefore. Ice and permafrost would be encountered in the construction of any petroleum transmitting pipeline in the arctic or antarctic regions, such as from the North Slope in the arctic to the South. Permafrost is a ground layer which is a mixture of earth and frozen water resulting from prevailing ambient temperatures. During the summer season in these regions, the permafrost thaws in some areas to depths varying from 6 inches to 2 feet. These areas then become quite unstable and incapable of supporting normal structural loads.

Oil is extracted from the fields on the North Slope at a temperature of about 140°F and is to be transmitted substantially at that temperature, the temperature being maintained by energy imparted at the booster pumping stations along the pipeline. Pumping at much lower temperatures is unfeasable since the viscosity of the product at lower temperatures creates too great a resistance to transmission through the pipeline. For normal transmission then, the pipeline becomes a heat source and becomes itself a destabilizing factor in constructing a pipeline in or proximate the frozen medium.

Various means have been proposed for overcoming the above problems, one of which is the elevation of the pipeline on platforms above the permafrost. This method, although avoiding thawing of the permafrost through direct contact, has several disadvantages, not the least of which is the widespread opposition by the public to the bisection of the Northland by a physical barrier such as that as would be created by an elevated pipeline with the attendant effect on the environment. Other disadvantages are that an exposed pipeline is vulnerable to damage and rupture by natural and man-made forces thereby constituting an ever-present threat to the environment. Within the state of the art at present, it is also difficult to fully insulate the above surface pipeline and prevent transmission of heat to the supporting structure, thereby rendering the permafrost liable to instability through thawing.

SUMMARY OF THE INVENTION

This invention provides a means for transmitting petroleum products through frozen media which is structurally unstable at or above freezing temperatures by furnishing a method for transmitting a viscous petroleum product in liquified gaseous medium at a temperature below freezing to avoid thawing of the surrounding or proximate frozen medium.

The invention further provides a means for stabilizing the area of frozen media around a petroleum pipeline by refrigeration derived from liquifaction of one of the constituents of the petroleum and subsequent transmission of the liquified constituent with the remaining petroleum constituents.

In a preferred embodiment, the invention provides a method of transmitting a petroleum product through a frozen medium which is structurally unstable at temperatures above freezing wherein a constituent of the product which is normally gaseous at ambient conditions is liquified and wherein the remaining petroleum constituents are transmitted as a mixture with the liquified constituent at conditions to maintain the liquefied constituent in a liquid state and the mixture and pipeline below freezing to thereby stabilize the adjacent frozen medium.

This application constitutes an alternative method to that disclosed in my co-pending application Ser. No. 102,065, filed Mar. 15, 1971 for Transmission of Petroleum Products Through a Frozen Medium.

These and other objects and advantages of the invention will become better understood by those skilled in the art by reference to the following detailed description.

BRIEF DESCRIPTION OF THE DRAWING

The drawing is a schematic showing a process in accordance with the invention.

DESCRIPTION OF THE PREFERRED EMBODIMENT

In the FIGURE, a receiver 2 is supplied with liquified natural gas (LNG) through a conduit 4 which supplies a liquifier 6 with gaseous natural gas for compression and cooling therein to produce a liquid phase thereof in a manner well known in the art. Liquid petroleum is supplied to the receiver 2 through a supply conduit 8 for formation into droplets and freezing into discreet particles within the receiver. During the freezing process in the receiver, heat is removed through evaporation of a portion of the LNG therein, which evaporated LNG is removed a "boil off" through a conduit 10 for reliquification in the reliquifier 12 and return to the receiver 2.

The resultant slurry of LNG and solidified petroleum product is withdrawn from the receiver 2 through discharge conduit 14 by means of a pump 16 and transmitted through a pipeline 18 to the desired destination point.

In the process, natural gas derived from the same field as the crude petroleum to be transmitted by pipeline disposed through the frozen medium, for example methane, is compressed and or cooled to a liquified state by means well known in the art.

In one embodiment, the crude petroleum product is sprayed or otherwise formed into droplets and a refrigerent, preferably the liquefied natural gas, is utilized to solidify or form the droplets into very viscous pellet-like formations which are then mixed with the liquified gas to form a slurry suitable for transmission through a pipline. The slurry is then transmitted at pressures sufficient to maintain the liquified component in a liquefied state. Conditions may be maintained throughout the length of the pipeline by suitable booster pumping stations as is common in the art.

In another embodiment, the crude petroleum product is mixed directly with the liquefied gas component and the mixture is transmitted through the pipeline at a pressure sufficient to maintain the liquefied component in a liquid state as above.

In both of the above-described embodiments, the resultant mixture is transmittable at temperatures below the freezing temperatures of the surrounding medium whether permafrost or ice thereby providing means to stabilize the structural formation proximate the pipeline regardless of the season or ambient conditions. The method set forth in this invention also provides many of the benefits and capabilities set forth for the alternate invention disclosed in the above-referred-to copending application.

What has been set forth above is intended as exemplary of a teaching in accordance with the invention to aid those skilled in the art in the practice thereof.

What is new and desired to be protected by Letters Patent of the United States is:

1. A method of transmitting a petroleum product through a frozen medium which is structurally unstable at temperatures at or above freezing comprising:
    liquefying a fluid which is normally gaseous at ambient conditions and storing in a confined area,
    spraying the petroleum product to be transmitted into the confined fluid whereby the petroleum product is frozen into solid droplets and the frozen droplets and liquified fluid form a pumpable slurry,
    pumping the resultant slurry through a pipeline supported by said frozen medium,
    pressurizing and maintaining said liquified fluid in a substantially liquid state throughout the length of the pipeline.

2. A method in accordance with claim 1 wherein said fluid comprises a normally gaseous component of the petroleum product.

3. A method in accordance with claim 1 wherein said pipeline is contained in direct contact within said medium.

4. A method in accordance with claim 1 wherein said medium is permafrost.

* * * * *